United States Patent Office
2,986,198
Patented May 30, 1961

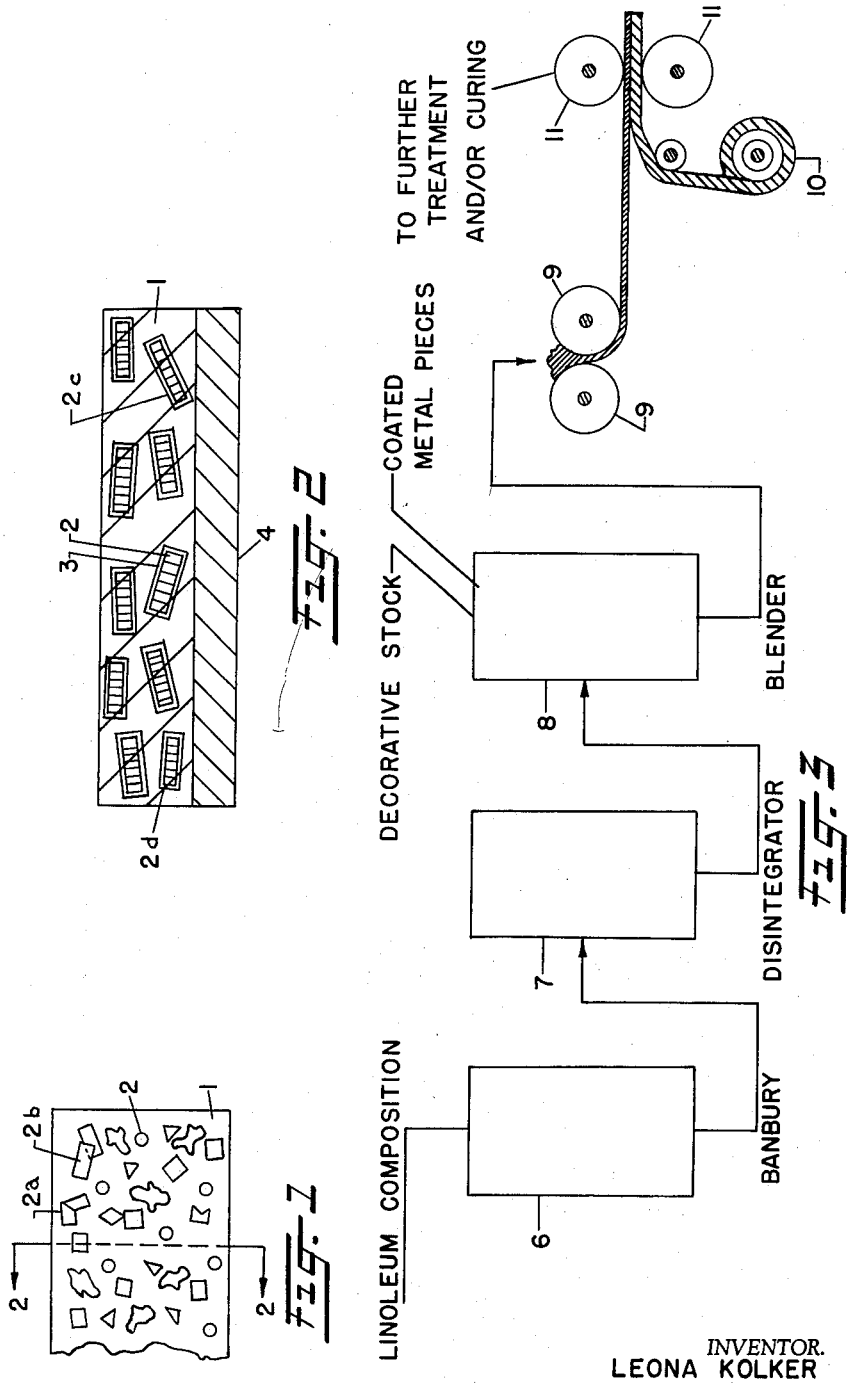

2,986,198
SURFACE COVERING AND PROCESS THEREFOR

Leona G. Kolker, Brooklyn, N.Y., and Joseph F. Dobry, Langhorne Manor, and William C. Weigle, Philadelphia, Pa., assignors to Congoleum-Nairn Inc., Kearny, N.J., a corporation of New York Filed Mar. 3, 1960, Ser. No. 12,643

13 Claims. (Cl. 154—26)

This invention relates to resilient, composition surface covering material, such as linoleum, and particularly to such products displaying new decorative effects and the process for obtaining them.

This application is a continuation-in-part of our application Ser. No. 785,811, filed January 9, 1959 which in turn was a continuation-in-part of our application Ser. No. 473,666, filed December 7, 1954, now abandoned.

Resilient composition surface covering materials, of the type with which the present invention is concerned, are prepared from well-known ingredients by equally well-known processes. They ordinarily contain a binder such as a mixture of oxidized linseed and/or other oils and resins such as plasticized, polymerized vinyl compounds of which vinyl chloride is the most common. Fillers such as wood flour, calcium carbonate, calcium sulphate, asbestos, and the like, are employed to provide strength, resistance to wear, flexibility and other desirable properties to the products. In the course of preparation, the fillers are well-mixed with the binder, and pigments are added for color. Linoleum can be formed as continuous sheets of varying widths by calendering or pressing and marketed in that form or cut into tiles prior to distribution.

The decorative effects which may be obtained in the above type of products are limited by the ingredients which must be employed therein and by the methods of manufacture. The ingredients limit the decoration in regard to color, luster, sheen, and the like. The method of manufacture governs primarily the physical location and appearance of the color areas which constitute the design. The most common type of decoration, and one which is easily obtained, is a streaked type of design known as jaspe. The well-known cross calendering technique, when employed with jaspe sheets, provides a product which has a marbelized appearance. Designs comprising definite repeating configurations which are known as geometrics may be prepared by first providing a basic or background sheet of material and cutting therefrom predetermined shaped pieces at various locations on the sheet. Cut-outs of contrasting color having the same shape as those removed from the base sheet are then placed in the spaces provided therefor. Geometric designs may also be obtained by a molding process. In accordance with this technique, different colored granules of the desired composition are screened onto a backing sheet, such as bituminized felt or burlap, in predetermined areas which are selected to provide repeating configurations. The composition so applied is then subjected to heat and pressure to effect a unitary mass of composition having the desired pattern. Geometrics are also prepared in other well-known ways.

Attempts have been made to achieve new decorative effects in composition surface covering material by mixing therewith a material which is not normally found in, or which is incompatible with, the usual surface covering composition ingredients. Such material is referred to as "foreign matter," and it has appeared desirable to take advantage of its visual appearance or shape in a finished resilient, composition surface covering product. Humphries suggested that powdered metal and/or mica be added to linoleum composition and disclosed a process therefor in Patent No. 1,873,587. Other efforts have been made to add metal powder, particularly copper and bronze.

The above described products, employing various types of foreign matter, have proved unsatisfactory and none of them have been marketed with any success because of certain inherent difficulties connected with a combination of foreign matter and surface covering composition. In order to achieve the decorative effect which is desired, the particles or pieces must be of sufficient size and present sufficient exposed surface area to be individually observable and to provide a distinctive visual appearance. They must be capable of being firmly bonded to the composition. On the other hand, they must be relatively flexible, since if the decorative material is hard and stiff, it flecks out of the surface of the composition under normal use conditions and breaks and crumbles within the composition during processing.

The problem of locating and orienting any such decorative foreign material has also proved difficult. It cannot be added during the first mixing of the binder, fillers, and pigments, because, if this mixing action is proper, the force thereof is sufficient to disintegrate it, thereby giving rise to the possibility of the appearance of off colors in the final product instead of an attractive design. The placing of such particles on a preformed sheet of surface covering composition, e.g. by sprinkling, frequently results in deformed and unattractive decorative particles and provides a product which has a decoration only on the surface, and therefore, readily worn off. Moreover, the usual processing techniques for preparing resilient, composition surface covering material as described above invariably results in such haphazard and irregular distribution of any foreign matter processed therewith that the final appearance of the product cannot be controlled, particularly in regard to effecting a pleasing surface decoration of any kind, to contact between individual particles of foreign matter which have no adhesion to each other, and to nonparallel arrangement of the particles on and within the sheet.

In the resilient, composition surface covering industry, it is often necessary to rework a large portion of the finished product which has been damaged in the course of preparation or which has become unacceptable for some other reason; for example, the waste composition which is accumulated while preparing the aforementioned geometrics. The practice is simply to add such material to a batch of fresh composition prior to, or in the course of, the first mixing of the binders, fillers, and pigments. By careful selection of the material which is to be reworked and of the new or fresh color composition, this procedure permits acceptable use of almost all of the material which must be reworked without seriously affecting the design or pattern which is desired. Most materials, which, in the past, have been added to a resilient surface covering composition other than the usual ingredients, have resulted in products which were unsuitable for reworking.

It is an object of this invention to provide resilient, composition surface covering products which exhibit new decorative effects.

Another object is to provide such products having relatively large pieces of metal incorporated therein.

Another object is to provide such products having metal pieces permanently embedded therein so that they cannot be easily removed therefrom in the course of normal use.

Another object is to provide such products having the metal pieces distributed throughout the body of the surface covering material so that as one layer of metal pieces wears away a new layer appears.

Still another object is to incorporate metal pieces in a resilient, composition surface covering which are large enough to have an individual appearance within and on the product and also large enough to reflect sufficient light to be noticeable at a reasonable distance therefrom.

Still another object is to provide a process for preparing the above described products which is simple in operation and serves to arrange the greater portion of the metal pieces in substantially parallel relationships to the plane of the surface covering.

Still another object is to provide a process wherein damaged or unacceptable finished goods may be easily reworked without noticeably impairing the design and/or pattern of the surface covering.

These and other objects will become apparent from the following detailed description of the invention.

It has now been discovered that flat, relatively thin pieces of metal may be incorporated into a resilient, composition surface covering by maintaining the principal portion of the metal pieces separate from the composition of the surface covering and/or other metal pieces by means of a material which adheres to and substantially envelops the metal pieces and which will bind to the composition of the surface covering.

Briefly stated, the process which provides the preferred product of the invention employs a sheet of thin metal such as aluminum foil that has been thinly coated with a material which adheres to the metal and which also adheres to the composition of the surface covering. The coated metal sheet is comminuted to relatively small pieces of regular or irregular shape, the lineal dimensions of which are in the range of from about 0.03 inch to about 0.36 inch and preferably from about 0.10 to 0.25 inch. Such pieces are added to a previously well-mixed, granulated surface covering composition and blended with it by the application of a force sufficient to thoroughly distribute the metal pieces but not great enough to deform or disintegrate them. The composition surface covering material is then processed in the usual manner, which includes calendering or molding in accordance with present practice as well as, if desired, providing a backing of bituminized felt, burlap, or the like.

With the exception of the novel decorative effect which is provided, a surface covering prepared in the manner described above has all of the characteristic features normally associated with the surface covering material. Numerous metal pieces appear at the surface of the material and are tightly joined to it. They may be flecked out only with difficulty even though one of the principal surfaces of most every such piece is completely exposed and not covered or smeared with the composition of the surface covering. Those pieces which, due to the random type of orientation inherent in the preferred process, are placed immediately adjoining or on top of another coated metal piece adhere as tightly to such other metal piece as they do to the composition surface covering material. The product remains smooth and the metal pieces on and within the composition are not deformed. The surface covering material retains its usual flexibility. Bending or flexing does not injure or distort the embedded metal pieces and consequently the product may be used and installed in the ordinary manner.

Although most metals are incompatible with surface covering compositions of the type with which the present invention is concerned, that is, they do not adhere thereto, all metals may be used in accordance with the present invention providing they can be obtained in the form of flat, relatively thin pieces. Aluminum foil, whether anodized or coated with a lacquer to provide a colored appearance, is preferred, however, because of its handleability, its flexibility, its compatibility with numerous bonding agents, its formability, its physical appearance, its light reflecting characteristics, its strength, its wear resistance, and its low cost. Other metals and metal alloys, such as iron, brass, bronze, gold, silver, copper, lead, zinc, tin cadmium, magnesium and the like, are operable.

The most practical manner of obtaining the flakes is to first form the metal into a thin sheet, and thereafter coat it with the spacing or bonding agent, as will be described more fully hereinafter. Thereafter, the sheet may be comminuted to small pieces by any means, such as a slitter chopper, a dicer, or any device which applies a proper shearing action along the desired lines of cleavage. Both of the above stated machines have proved highly successful in regard to speed of operation.

Some metals, such as brass, copper, lead, zinc and iron, have been known to react unfavorably with linoleum compositions causing deterioration and/or forming dark spots in and on the finished product. The reason for this reaction is not entirely known. The practice of the present invention, however, greatly minimizes the occurrence of the reaction and in some cases eliminates it altogether. When using such metals, however, it is essential for the metal to be substantially completely incased by the coating.

For reasons which will be set forth more fully hereinafter, it has been found that the metal pieces to be used in the present invention must be in the form of flat chips or flakes having two substantially parallel principal surfaces, each of which has a smallest lineal surface dimension of not less than about 0.03 inch and a greatest dimension not exceeding about four times the smallest dimension and not over about 0.36 inch. The maximum thickness of the metal pieces is also critical. A coated metal piece which exceeds 0.008 inch in thickness, when incorporated into a surface covering composition in accordance with the invention, will pull away and become detached from the composition upon a moderate amount of flexing. Surface covering products, in the course of processing and distribution, are frequently rolled up and such rolling causes excessively thick metal pieces at the surface to become loose and thus likely to be flecked out or easily removed in some other manner. Installation usually involves a considerable amount of bending or flexing and a similar result occurs. Between 0.006 and 0.008 inch the tendency of the metal pieces to pull away from the surface covering composition on flexing remains to some extent; however, below 0.006 inch, and preferably below 0.004 inch, the problem is for all practical purposes eliminated.

The industry has established a test for evaluating the quality of a surface covering product in regard to its ability to withstand flexing and bending. Mandrels 2 inches thick of various diameters are employed in the test. It has been found through experience that, if a resilient composition surface covering material which is adapted for installation on floors in the form of yard goods begins to crack, and the composition thereof pulls away from itself when a strip thereof about 2 inches wide and 8 inches long is placed over 180 degrees of a mandrel 4 inches in diameter, the product is unacceptable. Most quality, resilient floor coverings do not crack when similarly placed over a mandrel about 2 inches in diameter. The presence of metallic chips or flakes in such a product does not affect this characteristic of the floor covering composition. It has been found, however, that the gauge of the metal chip or flake has an important effect on the degree to which a floor covering composition embodying the present invention may be bent or flexed before such metallic chip or flake pulls away from the composition. The graph set forth below indicates this relationship.

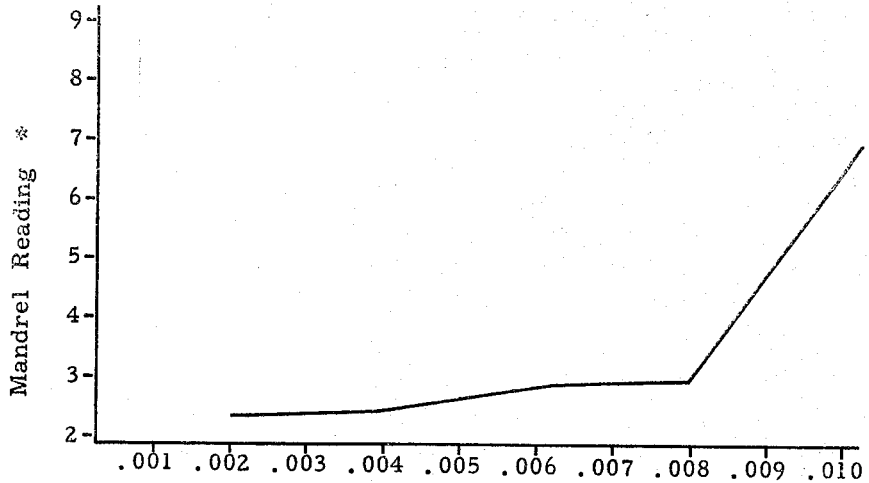

Gauge of Metal (Inches)
*Diameter in inches of smallest mandrel passed before failure.

Above a metal thickness of about 0.008 inch there is a sharp and definite change in the adhesion tolerance of a resilient surface covering composition to a coated metal flake or chip. A gauge of below about 0.004 inch is most preferred for all types of products in that it assures excellent adhesion of the metal piece to the composition under most of the conditions which are normally experienced in processing, distribution, and installation. Since products marketed as yard or sheet goods undergo a considerable amount of flexing, a metal gauge of below about 0.006 inch must be employed in connection with them; however, a metal gauge from about 0.006 inch to about 0.008 inch is satisfactory for products in the form of tiles which ordinarily are subjected to less flexing during distribution and installation. A thickness which exceeds about 0.008 inch does not permit satisfactory handling of any product as described herein.

The size of the metal pieces to be employed in the present invention is important not only in regard to thickness but also the lineal dimensions of the principal surfaces. If the pieces can properly be termed as granules, dust, or the like, they become difficult to handle in processing, have very little effect on the appearance of the product, have very little effect on light reflection, and tend to result in a product with a rough surface. Metal pieces having a smallest, lineal surface dimension less than about 0.03 inch and/or a greatest lineal dimension which is more than about four times the smallest, surface dimension cannot be uniformly distributed throughout a surface covering composition. The majority of such particles migrate to the lower areas of the finished product, not only making it impossible to control the decoration but also resulting in a considerable waste of decorative material. In addition, considerable distortion of the metal pieces will occur during the processing of those pieces having a greatest dimension exceeding about four times the smallest, surface dimension and shall not exceed about 0.36 inch. The maximum dimension of 0.36 inch is very important to obtaining a satisfactory product. If it reaches even 0.40 inch, the metal pieces will be extremely distorted and broken in processing. The use of pieces having a dimension of about 0.10 to about 0.25 inch is most preferred because of appearance and handleability. Square pieces measuring from about 0.10 inch to about 0.25 inch on each side also provide excellent products. All of the dimensions referred to herein and in the appended claims, unless otherwise clearly defined, are lineal dimensions since it has been found that other dimensions such as the perimeter or the like are not critical.

Numerous materials may be used for spacing the metallic chips or flakes a small distance apart from the surface covering composition; however, they must have several critical properties. They must adhere to the metal which is employed. They must adhere to the surface covering composition although, for the most part, they must retain their individual identity and physical appearance after they have been incorporated in the final product. In accordance with the preferred practice of the invention, it is desirable that the metal be coated to effect spacing and more particularly that a coating be employed which is transparent, and plastic at somewhat elevated temperatures. In some cases, however, it has been found desirable to mix coloring matter with the coating for special effects and purposes, and in that case, it is not necessary that the coating be transparent. Plasticity at elevated temperatures is generally desirable because it permits a flowing or bonding of the spacing material into the composition of the surface covering although nonplastic materials may be employed if they adhere to the metal and the surface covering composition. In either event, the spacing material should remain in a solid or plastic state at the highest temperature which it experiences in the course of processing. Otherwise, the spacing agent may become too flowable and be unable thereafter to function as a satisfactory bonding agent between the resilient composition surface covering material and the metal pieces. Processing temperatures vary widely depending on the type of product being prepared and range from as low as about 180° F. for linoleum and as high as about 300° F. for compositions containing vinyls in the ordinary course; and although the spacing agent is not likely to reach actual processing temperatures, it is preferred for purposes of control that it remain in the solid or plastic state at such temperatures.

In order to determine the ability of a spacing agent to adhere to metal, it is simply necessary to apply a coating of the spacing agent to a sheet of the metal and observe whether or not a bond is obtained. It is, of course, possible to employ a third material between the metal and the spacing agent in order to achieve a bond between the two; this is generally less desirable from an economy standpoint. The degree of adhesion between the spacing agent and the metal is not critical, it being necessary only that the spacing agent cannot be easily peeled from the metal sheet in the test described above.

The ability of the coating for the metal to bond to the surface covering composition may be determined simply by mixing small particles of the spacing agent with small particles of surface covering composition and thereafter providing a finished surface covering product in the normal manner. By subjecting the finished surface covering product to the aforementioned mandrel test and recording the diameter of the mandrel passed before separation first occurs between those particles of the spacing agent which are on the surface of the finished product and the principal composition of the finished product, a determination of compatibility can be made. It is preferred, of course, that a mandrel test reading of four or below be obtained; however, any degree of adhesion between the spacing agent and the composition which is greater than the adhesion of metal to the composition represents a spacing agent suitable for use in the present invention. Certain spacing agents, while not providing greatly increased adhesion to the composition, do permit excellent adhesion between overlapping and abutting metal pieces.

The following materials are illustrative of coating or spacing materials which can be used: butadiene-acrylonitrile copolymers, butadiene-acrylonitrile copolymers modified with other monomers, acrylic polymers and copolymers, polyvinyl acetate, polyvinyl acetyls, particularly vinyl butyral, copolymers of vinyl chloride and vinyl acetate and particularly those having free hydroxyl group, styrene-butadiene, oleoresinous materials such as long, medium, or short oil, natural or synthetic resin varnishes, condensation polymers of epichlorhydrin and bis phenol, amino-aldehyde condensation products such as triazine formaldehyde, melamine-formaldehyde, urea-formaldehyde, phenol-aldehydes such as phenol-formaldehyde, alkyd resins such as phthalic anhydride-glycerine, oil modified alkyds modified with soya bean oil, polyesters such as sebacic acid-ethylene glycol, cellulosic resins such as cellulose nitrate, ethyl cellulose, cellulose acetate and cellulose acetate butyrate, polyamides such as hexamethylene-diamineadipate, polyureathanes such as the reaction product of tolylenediisocyanate and ethyleneglycoladipate and the vegetable oil modifications thereof, sulfonamides such as toluene sulfonamide-formaldehyde, hydrocarbon resins such as polystyrene-coumaronindene and polyethylene.

Of these, polyvinyl acetate, polyvinyl butyral and copolymers of vinylchloride and vinyl acetate having free hydroxyl groups are preferred because they are easily handleable, transparent, thermoplastic, inexpensive, and provide an excellent bond between the metal pieces and the linoleum surface covering material. They provide an excellent wearing surface in connection with the metal pieces that appear on the surface of the composition, which in the absence of a protective material of some kind would scratch and, in some cases, tarnish.

The method of effectively using the materials described above to space the metallic chips or flakes from the surface covering composition will vary in accordance with the material which is selected and in accordance with well-known procedures in the art. The simplest and most economical method usually involves a coating operation wherein the spacing agent selected is dissolved in a solvent or emulsified and thereafter coated on a large piece of thin gauge metal. After the coating is dry, it is thereafter only necessary to comminute the sheet to the size and shape desired. It is also possible to obtain the metal pieces first and then apply the spacing or bonding agent.

The thickness of the coating which is applied to the pieces is of little importance provided the principal portion of each chip or flake is covered by the spacing material and the largest dimension of the chip is substantially above the thickness. As a general rule, the overall thickness should be less than one-half the largest dimension. If too small an area on the chips or flakes contains the coating, any subsequent use of the chips as described herein will be unsatisfactory. The chips will be more easily removed from the finished surface covering under normal use conditions, and the aforementioned metal to metal contact of the chips or flakes will occur. A coating thickness of 0.004 inch has proved excellent in operation, providing a good bond to the surface covering composition while being economical.

Solvents such as ketones, esters, alcohols, and aromatic hydrocarbons have proved satisfactory for dissolving most of the spacing agents, requiring, after solution, only application and drying to effect a coating on the metal. Emulsification of the spacing agent in water with or without the use of emulsifying agents, such as soaps, sulfonates, and non-ionic esters and ethers, has also proved satisfactory. Those spacing agents which are thermoplastic may be dusted on the metal and thereafter heated sufficiently to cause flowing and a coating is thereby effected.

The preferred process of incorporating the metal chips comprises simply blending the coated metal chips described above with small, workable particles of surface covering composition prior to subsequent processing of the composition. The term workable as used herein and in the appended claims refers to the ability of the surface covering composition to be handled in the normal manner to provide a sheet of smooth material. Working includes calendering, polishing, pressing, and the like, and these steps are employed in accordance with conventional practice. Linoleum composition, for example, to be workable, may not be completely oxidized and/or polymerized during processing and requires additional treatment after sheeting by way of subjecting it to an elevated temperature for a period of time which is called seasoning or curing.

The blending, prior to normal subsequent processing of the composition, which includes calendering and/or pressing in the case of linoleum provides a product wherein a large number of the metal chips or flakes are oriented so as to be parallel to the plane of the surface covering material, thus giving the greatest decorative effect. It has been found that when very small particles of composition are employed, at least about 75% of the metal pieces assume a position substantially parallel to the plane of the final product, and nearly perfect uniformity of distribution is obtained. This is contrary to what would be expected except for those pieces which appear on the surface of the goods, and in regard to those pieces, it would be expected they would be torn and distorted instead of firmly embedded in the product so as to be substantially completely exposed at one surface and yet provide an overall smooth surface.

The size of the pieces of composition particles should be carefully controlled and usually particles measuring more than about 0.50 inch in any direction causes many of the metal pieces to become distorted and oriented in a plane which is not parallel to the plane of the surface covering composition, and it makes the process difficult to control, especially in regard to uniformity of distribution of the metal pieces. Under careful control of the operating conditions, however, larger particles can be used.

The blending and subsequent processing referred to above also provides a random but well-spaced positioning of the metal pieces in the final composition surface covering. Many of them appear at the surface of the composition and one surface of such metal pieces is substantially completely exposed except, of course, for the spacing agent which covers them. Such pieces are to be considered as exposed whether or not the spacing agent contains a coloring material, in which case the metal itself will not be seen, but instead the pigment dispersed throughout the visible portion of the spacing agent will be observable. As a result of the process, very few of the metal pieces are placed on top of each other or in abutting relationship to each other. In the case of these pieces, however, the bond obtained is excellent and they may be flecked from the surface covering only with great difficulty. It has been discovered that the spacing of the metal pieces as described herein permits this latter characteristic of the product. If they are not so spaced, there will be very little adhesion in connection with any metal to metal contact.

The metal chips or flakes of the present invention may also be sprinkled on the surface of a prepared composition surface covering material prior to a calendering or pressing operation. Although an acceptable product is obtained in this manner, the effect due to the metal pieces, as indicated previously, disappears as the surface of the goods is worn away.

The preferred manner of sheeting linoleum composition which is blended with pieces of metal in accordance with the invention employs calender rolls as described in the Dobry Patent 2,624,068. By this procedure, the calender rolls have clean surfaces in that they do not have any linoleum adhering to their surfaces. If necessary, a cleaning and/or lubricating agent can be applied to the rolls and, if desired, removed therefrom at a point prior to the entrance of the mixture into the calender. This latter method not only removes excess linoleum composition which has remained on the roll after the roll has passed the conventional doctor blade employed for removing it, but also any other film or grease which might collect on the roll. Using clean calender rolls provide a product wherein there is a minimum amount of distortion of the metal pieces. There is a maximum number of metal pieces in a plane parallel to the plane of the linoleum being calendered, and there is a minimum amount of smearing of linoleum composition on the surface of those metal pieces which are exposed at the surface of the finished linoleum. The conventional type of calender when employed in the process of the present invention, generally results in a certain amount of undesirable smearing, thereby decreasing the overall attractiveness of the product. An alternate method of calendering which will also prevent smearing is by limiting the calender feed so only sufficient composition is fed to the calender to enable forming the sheet. Usually such a calender feed will be less than two inches in depth.

It has been discovered that very large amounts of metal may be incorporated in accordance with the present invention without noticeably altering the physical properties of the resilient, composition surface covering. However, if more than about 10%–15% of the weight of the surface covering is comprised of the metal pieces, the final product lacks sufficient flexibility for easy installation as sheet goods. Usually from about 1.5% to about 5% of metal by weight of the finished surface covering composition (excluding any backing material which may be employed) provides an attractive product with the metal embedded throughout the composition of the surface covering and on the surface thereof.

As aforementioned, it is common practice in the surface covering industry to rework a large amount of material which has become damaged in the course of processing or is unacceptable for some other reason. It has been discovered that this same procedure may be followed in the present invention without substantially affecting the overall pattern which is desired, even though the product to be reworked contains a considerable amount of foreign matter. This result was not expected due to the light-reflection characteristic of most metals and the difficulty to be expected in sufficiently comminuting the metal chips or flakes.

If it were not possible to rework such material, the present invention would be of little practical value, as the cost of the surface covering prepared in accordance with it would result in a noncompetitive product. In the practice of the invention, all of the material to be reworked is collected and thereafter added at the original composition mixing stage along with sufficient new composition to provide the amount of product and the pattern or design desired. Such first mixing is usually accomplished with a large amount of energy being expended in the form of heat and mechanical force in apparatus of the Banbury or Jermyn type. The material to be reworked is thereby thoroughly ground, the composition becomes flowable due to its thermoplastic character, and a unitary mass results wherein the metal powder is not apparent either visually or in regard to physical properties of the mass such as workability or the like. Commercial experience has proved that from about 15% to about 80% of material must be reworked in ordinary processing, the higher amounts being necessary in the case of nonmolded geometrics where only small portions of a surface covering sheet are used in a particular design. It has been found that up to about 10% by weight of metal chips or flakes may be incorporated in the first mixing stage of a binder, filler, and pigments without causing any off colors in the final product. This amount is in excess of the amount of metal which is likely to be present in that amount of surface covering which must be reworked due to other well-known limitations. Most finished surface covering products which have been affixed to a backing material such as bituminized felt are not reworked as described herein.

Fig. 1 of the drawings is a plan view of a product of the invention. The surface covering which serves as a base or matrix for the metal pieces 2 is noted at 1. Pieces 2a are representative of pieces which are in abutting relationship to each other and pieces 2b are representative of pieces which are in overlapping relationship.

Fig. 2 is an enlarged cross section of Fig. 1 taken at 2—2 thereon. The spacing agent 3 covers and adheres to the principal portion of each piece 2 while also being tightly bonded to the composition of the surface covering. Most of the pieces are parallel to the plane of the surface covering; however, piece 2c is at an angle thereto and piece 2d is cupped. As the composition becomes worn in use, the pieces such as 2c and 2d will first become apparent as points or small lines and their full decorative effect will not be achieved. A backing material 4 such as bituminized felt or burlap may be employed if desired and is usually used with standard gauge composition surface covering material.

Fig. 3 is a diagrammatic arrangement of a process for carrying out the present invention. An example of the preferred manner of operation with linoleum composition is described in connection therewith. The composition, comprising 36% oxidized linseed oil and rosin, 62.5% wood flour and inorganic fillers, and 1.5% dark red pigments, is added to a mixing device such as the Banbury mixer 6 and thoroughly commingled, fused and ground for about six minutes. Thereafter, the material is released to a material transfer means such as the conveyor and transported to a grinding means 7 such as a disintegrator which grinds the composition to a particle size averaging 0.040 inch. The small particles of composition are then transferred to a blender at 8, for example, by means of a conveyor. At blender 8, decorative stock is added which usually comprises small particles of linoleum composition which were previously prepared in accordance with the same process described heretofore but of contrasting color. The amount of decorative stock will vary with the pattern desired. To achieve the colors desired for the present example, 30%, based on the weight of the total composition, of decorative stock containing the same ingredients as the primary composition, except that light red pigments are employed in place of dark red pigments, is added.

The coated metal chips may also be added at blender 8. In the present example, 1.6% by weight of the total composition of 0.003 inch thick vinyl acetate coated aluminum foil in the shape of squares measuring ⅛ inch on each side are added along with an equal amount of the same type of metal pieces which are first coated with a gold lacquer prior to being coated with clear shellac. The blending action at 8 is gentle, being only sufficient to thoroughly commingle the metal pieces and the particles of composition without distorting the metal. The mixture from blender 8 is then transported to calender rolls 9, for example, by means of a conveyor. A two roll calender as described in the aforementioned Dobry patent is used in the present example because it minimizes smearing of the metal pieces at the surface of the composition, although any conventional type of calender may be employed in the invention. The mixture, likewise, may be molded at this stage in accordance with well-known techniques and the calendering operation eliminated altogether. The mixture is formed into a sheet of resilient, composition surface covering as it leaves the calender rolls 9 and has the metal pieces firmly embedded throughout the composition as well as on the surface, most of them in a plane parallel to the plane of the sheet. The sheet is smooth and has all the desirable characteristics set forth hereinbefore, as well as an attractive appearance. The sheet from the calender rolls is 0.53 inch thick and is consolidated with an asphalt impregnated felt backing 10 by means of consolidating rolls 11.

The product described above is seasoned or "stoved" for fifteen days at 180° F. and is thereafter tested under both laboratory and use conditions. Laboratory testing indicates that the product has equal or better properties than a control prepared in the same manner but without the metal pieces. As the surface decoration wears away, a new decoration appears. In use tests, the product wears at least as well as the control. After 65 days of wear by an average of 200 people, there is no measurable wear on either product.

While the above invention has been described in connection with detailed examples, it is not to be limited thereby. The changes in formulation, processing, and the like which are necessary to provide the different resilient, composition surface covering materials, such as linoleum, vinyl, rubber, and the like, are all within the knowledge of one skilled in the art, as are the changes in formulation, processing, and the like necessary to achieve certain results in regard to any one product. Reference is therefore to be had to the appended claims for the definition of the limits of the invention.

What is claimed is:

1. A process for preparing a composition sheet having a plurality of flat pieces of metal firmly embedded therein and distributed therethrough and at least some of them having one principal surface substantially completely visible at the surface of the wear layer, most of said pieces being in a plane parallel to the plane of the wear layer, which comprises blending pieces of metal having an overall thickness of less than about 0.008 inch and a smallest, surface dimension of at least about 0.03 inch and a greatest dimension less than 0.36 inch, the principal portion of the metal pieces being enveloped by a material different from the composition of the sheet and compatible therewith which adheres to the metal pieces and to the composition, with workable particles of composition, by a force sufficient to effect uniform distribution of the pieces of metal throughout the particles of composition but not great enough to deform the metal pieces, and thereafter forming the blended mixture into sheets and curing the sheets so formed.

2. A process for preparing linoleum having a plurality of flat pieces of metal firmly embedded therein and distributed therethrough from the surface to the back thereof and at least some of them having one principal surface substantially completely visible at the surface of the wear layer, most of said pieces being in a plane parallel to the plane of the wear layer, which comprises blending pieces of metal having an overall thickness of less than about 0.008 inch and a smallest, surface dimension of at least about 0.03 inch and a greatest dimension less than 0.36 inch, the principal portion of the metal pieces being enveloped by a material different from the composition of the linoleum and compatible therewith which adheres to the metal pieces and to the linoleum, with workable particles of uncured linoleum composition, by a force sufficient to effect uniform distribution of the pieces of metal throughout the particles of linoleum composition but not great enough to deform the metal pieces, and thereafter forming the blended mixture into sheets and curing the sheets so formed.

3. A process for preparing linoleum having a plurality of flat pieces of aluminum firmly embedded therein and distributed throughout the composition from the surface to the back thereof and at least some of them having one principal surface substantially completely visible at the surface of the linoleum, most of said pieces being in a plane substantially parallel to the plane of the linoleum, which comprises blending flat pieces of coated aluminum having an overall thickness of less than about 0.008 inch and a smallest, surface dimension of at least about 0.03 inch and a greatest dimension less than about 0.36 inch, the principal portion of such pieces being enveloped by a material different from the linoleum composition and compatible therewith which adheres to the metal pieces and to the linoleum, with particles of uncured linoleum, by a force sufficient to effect uniform distribution of the metal pieces throughout the particles of composition but not great enough to deform the metal pieces, and thereafter forming the blended mixture into sheets and curing.

4. The process according to claim 3 wherein said different material which envelopes said pieces is selected from the group consisting of polymers and copolymers of vinyl acetate, vinyl butyral and vinyl chloride.

5. A process for preparing linoleum having a plurality of thin, flat pieces of metal firmly embedded therein, said pieces being distributed throughout the linoleum from the surface to the back thereof and at least some of them having one principal surface substantially completely visible at the surface of the linoleum, most of said pieces being in a plane substantially parallel to the plane of the linoleum, which comprises blending flat pieces of coated metal having a thickness less than 0.008 inch and a length and width of about 0.03 to about 0.36 inch, the principal portion of them being enveloped by a material which adheres to the metal pieces and to the linoleum, and is compatible with the linoleum selected from the group consisting of polymers and copolymers of vinyl acetate, vinyl butyral and vinyl chloride, with uncured particles of linoleum composition, by a force sufficient to effect uniform distribution of the metal pieces throughout the particles of the composition but not great enough to deform the metal pieces, then passing the blended mixture through calender rolls having clean surfaces to form a sheet and thereafter curing said sheet.

6. A process for preparing linoleum having a plurality of pieces of metal firmly embedded therein and distributed throughout the linoleum from the surface to the back thereof and at least some of said pieces having one principal surface substantially completely visible at the surface of the linoleum, most of said pieces being in a plane substantially parallel to the plane of the linoleum, which comprises blending coated metal pieces having a thickness less than about 0.004 inch and a smallest, surface dimension of at least about 0.10 inch and a greatest dimension less than about 0.25 inch and less than about four times the smallest, surface dimension, the principal portion of the pieces being enveloped by a material different from linoleum which adheres to the metal pieces and to the linoleum and is compatible with the linoleum composition, with uncured particles of linoleum composition, by a force sufficient to effect uniform distribution of the metal pieces within the composition but not great enough to deform the metal pieces, then passing the blended mixture through calender rolls to form a sheet while applying a cleaning agent to at least one of the calender rolls and thereafter removing said agent and any remaining composition adhering to said roll in advance of the point of contact of said roll with the mixture, whereby said roll continuously presents a freshly cleaned surface to the mixture being calendered, and thereafter curing the sheet.

7. A process for preparing linoleum having a plurality of flat pieces of aluminum firmly embedded therein, said pieces being distributed through the linoleum and at least some of said pieces having one principal surface visible at the surface of the linoleum, most of said pieces being in a plane substantially parallel to the plane of the linoleum, which comprises blending flat pieces of coated aluminum having a thickness less than 0.008 inch and the smallest, surface dimension being at least 0.03 inch and the greatest dimension being less than about 0.36 inch, the principal portion of the aluminum pieces being coated with a material selected from the group consisting of polymers and copolymers of vinyl acetate, vinyl butyral and vinyl chloride, said coating material adhering to the aluminum pieces and being compatible with the linoleum, with particles of uncured linoleum composition, by a force sufficient to effect uniform distribution of the aluminum pieces throughout the particles of linoleum composition but not great enough to deform the aluminum pieces, then calendering the mixture between clean calender rolls to form a sheet and thereafter curing the sheet.

8. A process for preparing linoleum having a plurality of flat pieces of aluminum firmly embedded therein, said pieces being distributed throughout the linoleum from the surface to the back thereof and at least some of said pieces having one principal surface substantially completely visible at the surface of the linoleum, most of said pieces being in a plane substantially parallel to the plane of the linoleum, which comprises the steps of coating a flat sheet of coated aluminum having a thickness less than 0.004 inch with a material selected from the group consisting of polymers and copolymers of vinyl acetate, vinyl butyral and vinyl chloride, comminuting said sheet to a plurality of relatively small pieces having a smallest, surface dimension of at least about 0.08 inch and a greatest dimension of less than about 0.18 inch, blending said pieces of aluminum with uncured linoleum composition to thoroughly commingle said pieces of aluminum with said linoleum composition particles, calendering said mixture to form a sheet while applying a cleaning agent to at least one of the calender rolls and thereafter removing said agent and any remaining linoleum composition adhering to said roll in advance of the point of contact of said roll with said mixture, whereby said roll continuously presents a freshly cleaned surface to the mixture being calendered, and thereafter curing the sheet.

9. A process for preparing linoleum having a plurality of thin, flat pieces of metal firmly embedded therein, said pieces being distributed throughout the linoleum from the surface to the back thereof and at least some of them having one principal surface substantially completely visible at the surface of the linoleum, most of said pieces being in a plane substantially parallel to the plane of the linoleum, which comprises blending flat pieces of coated metal having a thickness less than 0.008 inch and a length and width of about 0.05 to about 0.36 inch, the principal portion of them being enveloped by a material which adheres to the metal pieces and is compatible with the linoleum selected from the group consisting of polymers and copolymers of vinyl acetate, vinyl butyral and vinyl chloride, with uncured particles of linoleum composition having a greatest dimension less than about 0.50 inch, by a force sufficient to effect uniform distribution of the metal pieces throughout the particles of the composition but not great enough to deform the metal pieces, then passing the blended mixture through calender rolls to form a sheet while applying a cleaning agent to at least one of the calender rolls and thereafter removing said agent and any linoleum composition adhering to said roll in advance of the point of contact of said roll with said composition, whereby the roll continuously presents a freshly cleaned surface to the composition, and thereafter curing said sheet.

10. A smooth resilient decorative sheet of substantial thickness formed of linoleum composition containing flat pieces of metal which are substantially noncohesive with the composition comprising, a smooth, resilient, opaque linoleum composition wear layer having firmly embedded throughout the composition a plurality of said flat pieces of metal having a coating of material which substantially envelopes each piece of metal and adheres thereto and which is compatible with and adheres to the composition, said coated pieces having a thickness less than 0.008 inch and a length and width of about 0.03 to about 0.36 inch, a substantial number of said pieces having one principal surface completely visible in and flush with the surface of the wear layer.

11. The smooth resilient decorative sheet of claim 10 wherein said flat pieces of metal are present from about 1.5 to about 15 percent by weight based on the weight of the composition.

12. The smooth resilient decorative sheet of claim 10 wherein the width of said flat pieces of metal does not exceed four times their length.

13. A smooth resilient decorative sheet of substantial thickness formed of a composition material containing flat pieces of metal which are substantially noncohesive with the composition comprising a smooth, resilient, opaque linoleum composition wear layer having firmly embedded throughout the composition a plurality of said flat pieces having a coating of material selected from a group consisting of polymers and copolymers of vinyl acetate, vinyl butyral and vinyl chloride which substantially envelopes each piece of metal and adheres thereto and which is compatible with and adheres to the composition, said coated pieces having a thickness less than 0.008 inch and a length and width of about 0.03 to about 0.36 inch, a substantial number of said pieces having one principal surface completely visible in and flush with the surface of the wear layer.

References Cited in the file of this patent

UNITED STATES PATENTS

| | | |
|---|---|---|
| 1,873,587 | Humphreys | Aug. 23, 1932 |
| 2,054,454 | Thies et al. | Sept. 15, 1936 |
| 2,154,438 | Conklin | Apr. 18, 1939 |
| 2,302,305 | Farrell | Nov. 17, 1942 |
| 2,353,995 | Conner | July 18, 1944 |
| 2,624,068 | Dobry | Jan. 6, 1953 |
| 2,689,981 | McCarthy | Sept. 28, 1954 |
| 2,712,190 | Sobel | July 5, 1955 |